US 8,225,011 B2

(12) United States Patent
Soeda et al.

(10) Patent No.: US 8,225,011 B2
(45) Date of Patent: *Jul. 17, 2012

(54) METHOD OF MONITORING DEVICE FORMING INFORMATION PROCESSING SYSTEM, INFORMATION APPARATUS AND INFORMATION PROCESSING SYSTEM

(75) Inventors: Takayoshi Soeda, Chigasaki (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,016

(22) Filed: Aug. 16, 2011

(65) Prior Publication Data

US 2011/0302332 A1 Dec. 8, 2011

Related U.S. Application Data

(63) Continuation of application No. 12/365,297, filed on Feb. 4, 2009, now Pat. No. 8,024,494.

(30) Foreign Application Priority Data

Nov. 20, 2008 (JP) ................................ 2008-296959

(51) Int. Cl.
*G06F 13/12* (2006.01)
(52) U.S. Cl. ........................................... 710/18; 710/62
(58) Field of Classification Search ......................... None
See application file for complete search history.

(56) References Cited

U.S. PATENT DOCUMENTS

| 5,655,081 | A | 8/1997 | Bonnell et al. |
|---|---|---|---|
| 6,389,427 | B1 | 5/2002 | Faulkner |
| 6,876,994 | B2 | 4/2005 | Ishikawa et al. |
| 7,158,257 | B2 | 1/2007 | Hosoda |
| 7,634,590 | B2 | 12/2009 | Addleman et al. |
| 7,734,637 | B2 | 6/2010 | Greifeneder et al. |
| 2005/0108385 | A1 | 5/2005 | Wechter et al. |
| 2007/0233842 | A1* | 10/2007 | Roberts et al. ............... 709/223 |
| 2008/0239979 | A1 | 10/2008 | Chou et al. |

FOREIGN PATENT DOCUMENTS

| GB | 2 328 043 | 2/1999 |
|---|---|---|
| JP | 2008-033725 | 2/2008 |
| WO | WO 2004/001555 A2 | 12/2003 |

OTHER PUBLICATIONS

International Search Report in International Application No. PCT/JP2009/005603 issued Feb. 2, 2010.

* cited by examiner

*Primary Examiner* — Cheng-Yuan Tseng
(74) *Attorney, Agent, or Firm* — Brundidge & Stanger, P.C.

(57) ABSTRACT

A monitoring apparatus communicatively coupled to one or more devices forming an information processing system manages each of the devices by setting the device to be in any one of monitoring states including a monitoring target to be always monitored, a semi-monitoring target to be determined if there is a change in resources and a non-monitoring target being neither the monitoring target nor the semi-monitoring target. The monitoring apparatus newly acquires resource information on a device whose monitoring state is currently set to be the monitoring target or the semi-monitoring target, and determines if any of the resources of the device is changed on the basis of the newly acquired resource information, the resource information acquired last time, and a determination condition. When determining that any of the resources has been changed, the monitoring apparatus outputs a screen prompting a change of the monitoring state of the device.

15 Claims, 16 Drawing Sheets

AUTHENTICATION INFORMATION 300

| USER ID | PASSWORD | PROTOCOL |
|---|---|---|
| Administrator | ****** | WMI |
| Root | ****** | SSH |

SEARCH RANGE SPECIFYING INFORMATION 350

| FIRST IP ADDRESS | LAST IP ADDRESS |
|---|---|
| 10.210.80.1 | 10.210.80.200 |
| 10.192.63.1 | 10.192.63.250 |

DEVICE MANAGEMENT TABLE 400

| IDENTIFICATION ID 401 | DEVICE TYPE 402 | MONITORING STATE 403 | CONFIGURATION CHANGE OR NO-CHANGE 404 | IP ADDRESS 405 |
|---|---|---|---|---|
| 1 | Server | NON-MONITORING TARGET | | 10.210.66.77 |
| 2 | Server | MONITORING TARGET | | 10.210.66.78 |
| 3 | Storage | NOT SET | | 10.210.66.97 10.210.83.99 |
| 4 | Switch | SEMI-MONITORING TARGET | CHANGED | 10.210.83.63 |
| 5 | Storage | MONITORING TARGET | | 10.210.113.7 |

FIG. 4

BASIC RESOURCE INFORMATION 500
(BASIC INFORMATION ON SERVER)

| ITEM | LAST ACQUISITION VALUE | CURRENT ACQUISITION VALUE | CHANGED OR NOT CHANGED |
|---|---|---|---|
| IDENTIFICATION ID | 1 | 1 | — |
| OS NAME | OS2003 | OS2008 | CHANGED |
| OS VERSION | 1.2.3 | 1.2.3 | NOT CHANGED |
| DEVICE NAME | MyServer | MyServer | NOT CHANGED |
| INSTALL PP | RDB PP | ~~RDB0PP~~ | CHANGED |
| INSTALL PP | XXXX | XXXX | NOT CHANGED |
| INSTALL PP | XXXX | XXXX | NOT CHANGED |
| NETWORK CARD TYPE | NIC | NIC | NOT CHANGED |
| PORT INFORMATION | 192.168.123.4 | 192.168.123.4 | NOT CHANGED |
| PORT USAGE STATE | IN USE | IN USE | NOT CHANGED |
| PORT INFORMATION | ∅ | ∅ | NOT CHANGED |
| PORT USAGE STATE | NOT IN USE | NOT IN USE | NOT CHANGED |
| PORT INFORMATION | 192.168.120.34 | 192.168.120.34 | NOT CHANGED |
| PORT USAGE STATE | IN USE | IN USE | NOT CHANGED |
| NETWORK CARD TYPE | FC | FC | NOT CHANGED |
| PORT INFORMATION | Port A | Port A | NOT CHANGED |
| PORT USAGE STATE | IN USE | IN USE | NOT CHANGED |
| PORT INFORMATION | Port B | Port B | NOT CHANGED |
| PORT USAGE STATE | IN USE | IN USE | NOT CHANGED |

FIG. 5A

DETAILED RESOURCE INFORMATION 600
(DETAILED INFORMATION ON SERVER)

| ITEM | VALUE | STATE VALUE | PERFORMANCE VALUE |
|---|---|---|---|
| IDENTIFICATION ID | 1 | — | — |
| CPU | CPUA 2.8GHz | — | — |
| MEMORY | 2G | NORMAL | 512M |
| DISK DRIVE C: | 80G | NORMAL | 3G |
| DISK DRIVE D: | 160G | ABNORMAL | — |

DETERMINATION RULE TABLE 700

| MONITORING STATE 701 | DEVICE TYPE 702 | COMPARISON INFORMATION TYPE 703 | DETERMINATION CONDITION 704 |
|---|---|---|---|
| SEMI-MONITORING TARGET | IP DEVICE | IP ADDRESS | ADDITION OR CHANGE |
| SEMI-MONITORING TARGET | FC DEVICE | FC PORT CONFIGURATION | ADDITION |
| SEMI-MONITORING TARGET | COMPUTER | VOLUME | ADDITION |
| SEMI-MONITORING TARGET | COMPUTER | HOST NAME | CHANGE AND SATISFY CONDITION NUMBER 001 |
| SEMI-MONITORING TARGET | COMPUTER WITH XX OS | OS TYPE | OS SERIES CHANGE (SUCH AS OS 2003 TO OS 2005) OR SERVICE PACK CHANGE |
| SEMI-MONITORING TARGET | COMPUTER WITH XX OS | OS VERSION | MAJOR VERSION CHANGE |
| SEMI-MONITORING TARGET | SWITCH DEVICE | PORT STATE | USE INITIATION OR IP ADDRESS CHANGE |
| MONITORING TARGET | INSTALL PP | RDB PP | DELETION |

FIG. 11

DEVICE MANAGEMENT TABLE 450

| IDENTIFICATION ID | DEVICE TYPE | IP ADDRESS | PORT NUMBER | MONITORING STATE | CONFIGURATION CHANGE OR NO CHANGE |
|---|---|---|---|---|---|
| 1 | IPSwitch | 10.210.66.77 | 1 | MONITORING TARGET | |
| | | | 2 | MONITORING TARGET | |
| | | | 3 | MONITORING TARGET | |
| | | | 4 | NON-MONITORING TARGET | |
| | | | 5 | NON-MONITORING TARGET | CHANGED |
| | | | 6 | SEMI-MONITORING TARGET | |

451 452 453 454 455 456

BASIC RESOURCE INFORMATION 550

| ITEM | LAST ACQUISITION VALUE | CURRENT ACQUISITION VALUE | CHANGED OR NOT CHANGED |
|---|---|---|---|
| IDENTIFICATION ID | 10 | 10 | — |
| PORT NUMBER 1 | LinkUp | LinkUp | NOT CHANGED |
| PORT NUMBER 2 | LinkUp | LinkUp | NOT CHANGED |
| PORT NUMBER 3 | LinkUp | LinkUp | NOT CHANGED |
| PORT NUMBER 4 | LinkDown | LinkDown | CHANGED |
| PORT NUMBER 5 | LinkDown | LinkDown | NOT CHANGED |
| PORT NUMBER 6 | LinkDown | LinkUp | CHANGED |

FIG. 12

DETERMINATION RULE TABLE 750

| MONITORING STATE | DEVICE TYPE | COMPARISON INFORMATION TYPE | DETERMINATION CONDITION |
|---|---|---|---|
| SEMI-MONITORING TARGET | IP DEVICE | PORT STATE | LinkDown → LinkUp |
| MONITORING TARGET | IP DEVICE | PORT STATE | LinkDown → LinkDown |

FIG. 13

METHOD OF MONITORING DEVICE FORMING INFORMATION PROCESSING SYSTEM, INFORMATION APPARATUS AND INFORMATION PROCESSING SYSTEM

This application is a continuation application of U.S. application Ser. No. 12/365,297 filed on Feb. 4, 2009, now allowed, the entirety of which is incorporated herein by reference.

CROSS-REFERENCE TO RELATED APPLICATION

The present application claims priority from Japanese Patent Application No. 2008-296959 filed on Nov. 20, 2008, which is herein incorporated by reference.

BACKGROUND OF THE INVENTION

1. Field of the Invention

The present invention relates to a method of monitoring a device forming an information processing system, an information apparatus, and an information processing system. The present invention particularly relates to a technique for appropriately managing a monitoring target of a monitoring apparatus that monitors one or more devices forming an information processing system.

2. Related Art

As a method of monitoring a device in an information processing system, Japanese Patent Application Laid-open Publication No. 2008-33725 discloses the following monitoring technique. According to the technique, a monitoring apparatus accumulates: operational monitoring rules for analyzing operation information transmitted from monitoring target devices and then monitoring the states of the monitoring target devices; configuration information of each of the monitoring target devices; and setting knowledge that is information required to generate monitoring setting information for each type of determination condition included in the operational monitoring rules. When generating monitoring setting information for a specific monitoring target device specified by an administrator from among multiple monitoring target devices, the monitoring apparatus extracts, on the basis of the configuration information of the specific monitoring target device, an operational monitoring rule to be used for generating the monitoring setting information from the operational monitoring rules accumulated in an analysis setting accumulation unit. The monitoring apparatus then generates the monitoring setting information corresponding to the extracted operational monitoring rule on the basis of setting knowledge corresponding to a type of determination condition in the operational monitoring rule in the setting knowledge accumulated in a setting knowledge accumulation unit. The specific monitoring target device detects operation information of the device itself in accordance with the monitoring setting information generated by monitoring setting generation means and then transmits the operation information to the monitoring apparatus.

In a case where an operation state of each of devices forming an information processing apparatus is to be monitored by a monitoring apparatus communicatively coupled to the devices, the processing load of the monitoring apparatus increases if all of the devices are set as the monitoring targets. Accordingly, effective use of the monitoring apparatus is not necessarily accomplished in this case. Thus, it is necessary to set only a device that needs to be monitored as the monitoring target among the devices forming the information processing system, for example. In a case where only a specific device is set as the monitoring target as described above, what is required in view of security of the information processing system and the processing load of the monitoring apparatus is a system for appropriately managing monitoring targets of the monitoring apparatus. Specifically, in the system, when a priority of a device changes due to a change in a configuration or setting of the devices, the monitoring state of the device needs to be reviewed in order to surely set a device that needs to be monitored as a monitoring target and to remove a device that does not need to be monitored from the monitoring targets.

SUMMARY OF THE INVENTION

The present invention has been made in light of the above problem, and an object thereof is to provide a method of monitoring a device forming an information processing system, an information apparatus and an information processing system that are capable of appropriately managing a monitoring target of a monitoring apparatus that monitors the device forming the information processing system.

In order to solve the aforementioned problem, an aspect of the present invention provides a method of monitoring one or more devices forming an information processing system, the method comprising the steps, executed by an information apparatus communicatively coupled to the one or more devices, of:

acquiring, from each of the devices, resource information that is information related to resources of the device, and monitoring, on the basis of the acquired resource information, an operation state of the device set as a target to be always monitored;

managing each of the devices by setting the device to be in any one of monitoring states including a monitoring target being the target to be always monitored, a semi-monitoring target not being the target to be always monitored but being a target to be determined whether or not there is a change in the resources of the device, and a non-monitoring target being neither the monitoring target nor the semi-monitoring target;

storing information indicating a current monitoring state of each of the devices among the monitoring states;

storing the resource information acquired from each of the devices last time;

newly acquiring the resource information on the device from the device whose monitoring state is currently set to be the semi-monitoring state, and determining whether or not there is a change in the resources of the device on the basis of the newly acquired resource information, the resource information acquired and stored last time, and a previously stored determination condition; and outputting information prompting a change of the monitoring state of the device if it is determined in the determination step that there is a change in the resources of the device.

According to the above aspect of the present invention, when there is a change in the resources of the device, the user is automatically provided with an opportunity to determine whether or not to change the monitoring state of a device set as the semi-monitoring target to the monitoring target. Thus, it is possible to prevent a situation where the monitoring apparatus fails to monitor an important trouble with a device not being monitored because the user forgets to change the monitoring state of the device from the semi-monitoring target to the monitoring target when the user needs to change the monitoring state of the device to the monitoring target due to a change in the resources.

Another aspect of the present invention provides the aforementioned method further comprising the steps, executed by the information apparatus, of:

newly acquiring the resource information on the device from the device whose monitoring state is currently set to be the monitoring target, and determining whether or not there is a change in the resources of the device on the basis of the newly acquired resource information, the resource information acquired and stored last time, and a previously stored determination condition; and outputting information prompting a change of the monitoring state if it is determined in the determination step that there is a change in the resources of the device.

According to the above aspect of the present invention, when there is a change in the resources of the device, the user is automatically provided with an opportunity to determine whether or not to change the monitoring state of a device set as a monitoring target to a semi-monitoring target (or to a non-monitoring target). Thus, it is possible to prevent a situation where a device no longer needed to be monitored is continuously monitored because the user forgets to change the monitoring state of the device from the monitoring target to the semi-monitoring target (or to the non-monitoring target) when the device becomes no longer needed to be the monitoring target due to a change in the resources.

The problem and the solving methods disclosed in this application will be more fully apparent with reference to the following description and the accompanying drawings.

According to the present invention, it is possible to appropriately manage a monitoring target of a monitoring device that monitors a device forming an information processing system.

BRIEF DESCRIPTION OF THE DRAWINGS

FIG. 3A is a diagram showing an example of authentication information 300;

FIG. 3B is a diagram showing an example of search range specifying information 350;

FIG. 4 is a diagram showing an example of a device management table 400;

FIG. 5A is a diagram showing an example of basic resource information 500;

FIG. 6 is a diagram showing an example of detailed resource information 600;

FIG. 7 is a diagram showing an example of a determination rule table 700;

FIG. 11 is a diagram showing an example of a device management table 450;

FIG. 12 is a diagram showing an example of basic resource information 550; and FIG. 13 is a diagram showing an example of a determination rule table 750.

DETAILED DESCRIPTION OF THE INVENTION

Embodiments of the present invention will be described below with reference to the accompanying drawings.

Embodiment 1

Figure 1A:
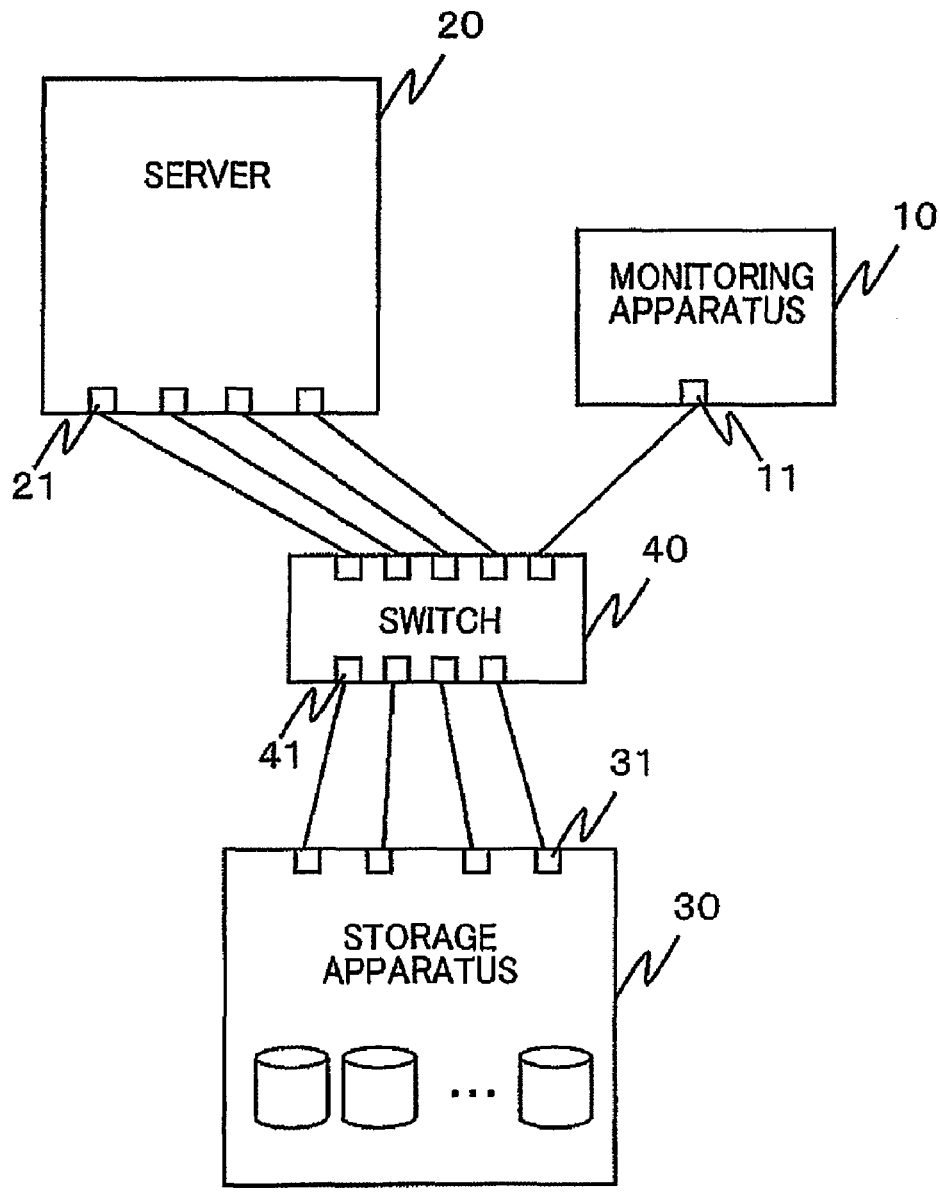
FIG. 1A is a diagram showing a schematic configuration of an information processing system 1 described as Embodiment 1.

FIG. 1A shows a schematic configuration of an information processing system 1 described as Embodiment 1. As shown in FIG. 1A, the information processing system 1 includes a monitoring apparatus 10, at least one server 20, at least one storage apparatus 30 and at least one switch 40.

The server 20, the storage apparatus 30 and the switch 40 form a storage system. In this storage system, the server 20 accesses the storage apparatus 30 via the switch 40 and then inputs and outputs data to and from the storage apparatus 30. The monitoring apparatus 10 monitors an operation state of the storage system. The monitoring apparatus 10 includes user interfaces (CUI (Character User Interface)) and ((GUI) Graphical User Interface) for monitoring and controlling the storage system.

The server 20 is communicatively coupled to the storage apparatus 30 via the switch 40. Furthermore, the server 20 is communicatively coupled for example to an external device (not shown) such as a terminal device. The server 20 accesses data stored in the storage apparatus 30 based on an I/O request received from the external device, and provides various services to the external device.

A communication network formed by coupling communication ports 21 of the server 20, communication ports 31 of the storage apparatus 30 and communication ports 41 of the switch 40 with each other is for example a LAN (local area network), a SAN (storage area network), a WAN (wide area network), the Internet, a public telecommunication network, a dedicated line or the like.

The switch 40 is a LAN switch (a switching hub for 10BASE-T/100BASE-T/1000 BASE-T (TX) connections, for example) or a Fibre Channel switch. The monitoring apparatus 10 communicates with the server 20, the storage apparatus 30 and the switch 40 via a LAN, a WAN, the Internet, a public telecommunication network, a dedicated line or the like, for example. Note that an assumption is made in the following description that the switch 40 is a LAN switch unless specifically noted otherwise. In addition, a communication port 11 of the monitoring apparatus 10 is assumed to be coupled to one of the communication ports 41 of the switch 40 and thereby to be communicatively coupled to the server 20, the storage apparatus 30 and the switch 40. Moreover, an assumption is made that the monitoring apparatus 10, the server 20, the storage apparatus 30 and the switch 40 communicate with each other using TCP/IP protocol.

Figure 1B:
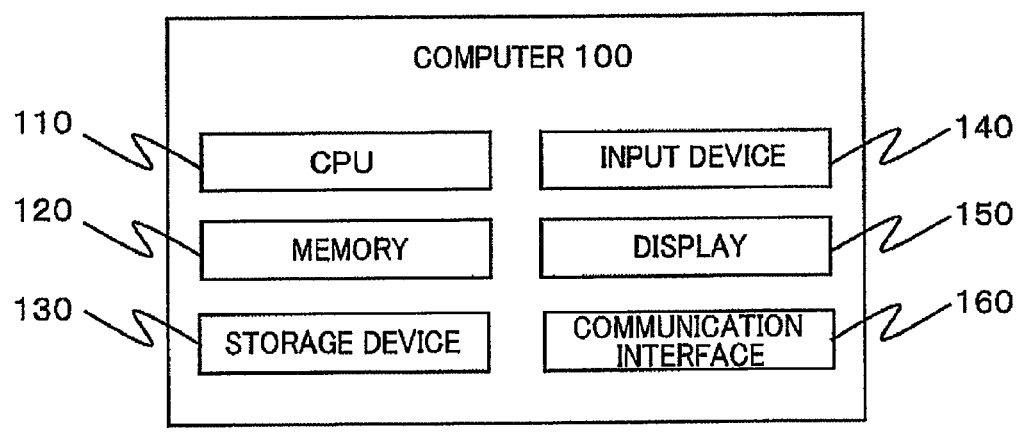
FIG. 1B is a diagram showing an example of a hardware configuration of a computer 100 usable as a monitoring apparatus 10 or a server 20.

FIG. 1B shows an example of a hardware configuration of a computer 100 (information apparatus) usable as the monitoring apparatus 10 or the server 20. As shown in FIG. 1B, the computer 100 includes a CPU 110, a memory 120 (e.g., a RAM (Random Access Memory) or a ROM (Read Only Memory)), a storage device 130 (e.g., a hard disk drive or a semiconductor storage device (SSD: Solid State Drive)), an input device 140 (e.g., a keyboard or a mouse) receiving operation input from the user, a display 150 (e.g., a liquid crystal display monitor or a CRT display monitor) and a communication interface 160 (e.g., a NIC (Network Interface Card) or an HBA (Host Bus Adapter)) achieving communications with other devices.

Figure 1C:
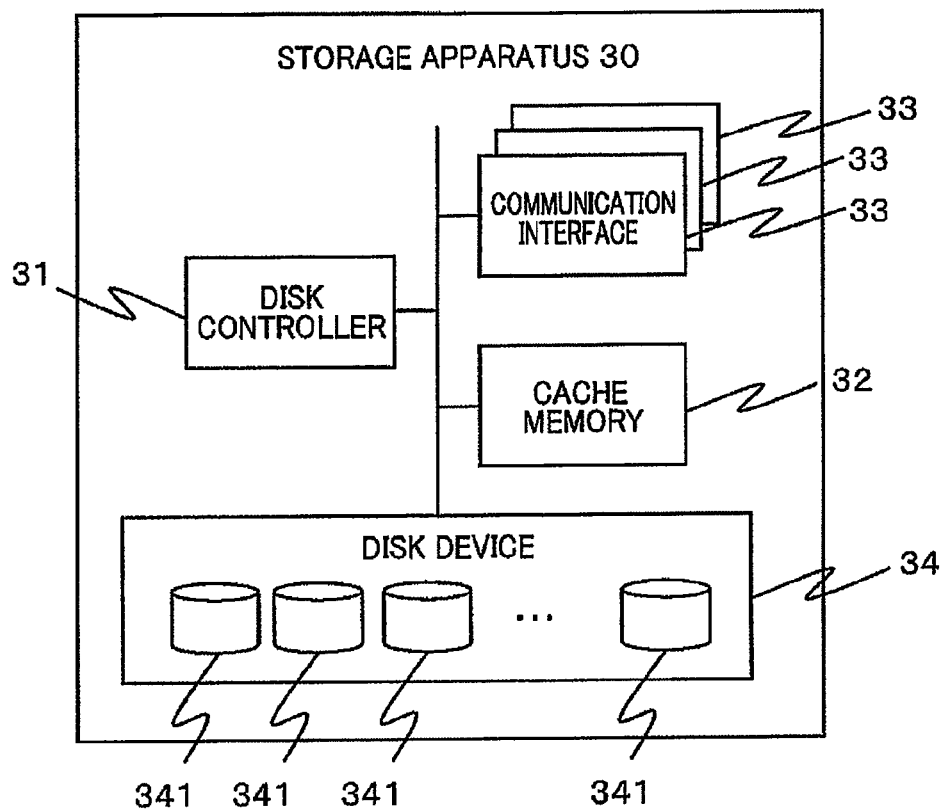
FIG. 1C is a diagram showing an example of a hardware configuration of a storage apparatus 30.

FIG. 1C shows an example of a hardware configuration of the storage apparatus 30. The storage apparatus 30 is a disk array, for example. As shown in FIG. 1C, the storage apparatus 30 includes a disk controller 31, a cache memory 32, communication interfaces 33 and a disk device 34. The communication interfaces 33 communicate with the server 20 or the monitoring apparatus 10 via the switch 40. The disk controller 31 includes a CPU and a memory. The disk controller 31 performs various kinds of processing for implementing functions of the storage apparatus 30. The disk device 34 includes one or more hard disk drives 341 (physical disk drives). The cache memory 32 stores data to be written onto the disk device 34, or data having been read from the disk device 34, for example.

Figure 1D:
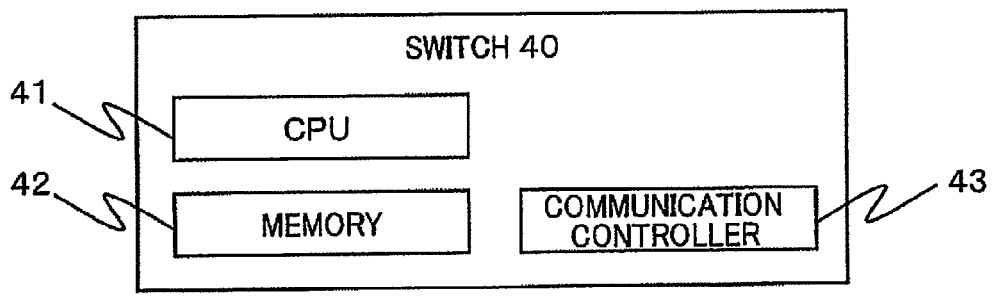
FIG. 1D is a diagram showing an example of a hardware configuration of a switch 40.

FIG. 1D shows an example of a hardware configuration of the switch 40. As shown in FIG. 1D, the switch 40 includes a CPU 41, a memory 42 and a communication controller 43. The CPU 41 implements a function to manage mapping between the communication ports 41 and network addresses, a filtering function and a security function for example, by executing programs stored in the memory 42. The memory 42 is a RAM, a ROM or a non-volatile memory (e.g., a flash memory). The memory 42 stores the programs for implementing the aforementioned functions, various tables for managing mapping between sources and destinations of network addresses, port numbers or the like, and setting information related to the filtering function and the security function. The communication controller 43 is a switch controller, for example. On the basis of source information and destination information on a frame or a packet to be inputted and outputted to and from each of the communication ports 41, the communication controller 43 performs transfer control between the communication ports 41 for the frame or packet to be inputted and outputted.

Figure 2A:
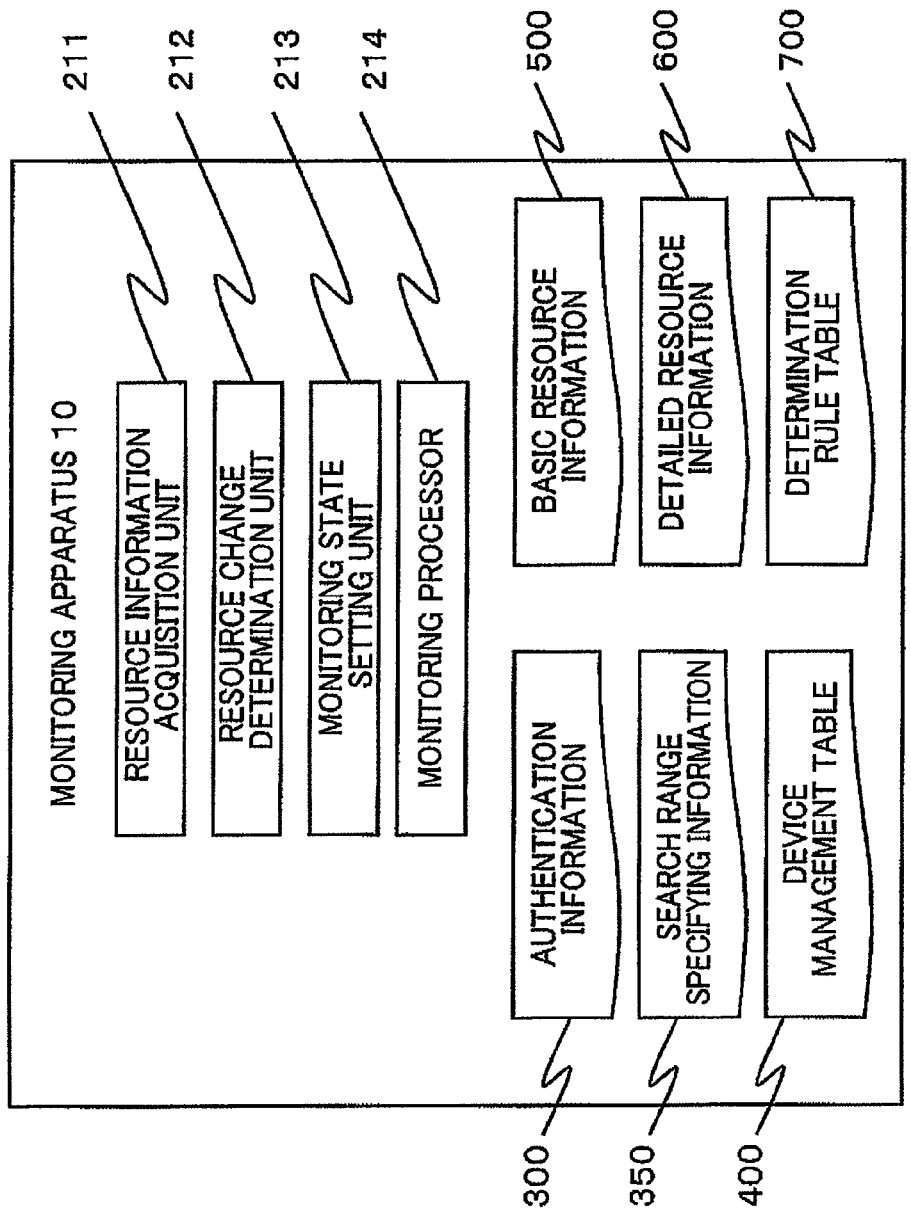
FIG. 2A is a diagram showing primary functions included in the monitoring apparatus 10, and primary data managed by the monitoring apparatus 10.

FIG. 2A shows primary functions included in the monitoring apparatus 10 and primary data managed by the monitoring apparatus 10. As shown in FIG. 2A, the monitoring apparatus 10 includes a resource information acquisition unit 211, a resource change determination unit 212, a monitoring state setting unit 213 and a monitoring processor 214 as the primary functions. Note that these functions are implemented when the CPU 110 of the monitoring apparatus 10 executes the programs stored in the memory 120 of the monitoring apparatus 10.

The monitoring apparatus 10 manages (stores) authentication information 300, search range specifying information 350, a device management table 400, basic resource information 500, detailed resource information 600 and a determination rule table 700. Note that these pieces of information are managed in databases by a database management system (DBMS) operating in the monitoring apparatus 10 (or externally of the monitoring apparatus 10), for example.

Among the functions included in the monitoring apparatus 10, the resource information acquisition unit 211 acquires information used for monitoring an operation of each of the devices (hereinafter, referred to as resource information) from the server 20, the storage apparatus 30 and the switch 40 and then manages (stores) the acquired information as the basic resource information 500 or the detailed resource information 600.

The resource change determination unit 212 determines, on the basis of the information acquired by the resource information acquisition unit 211, whether or not there is a change in the resources of the server 20, the storage apparatus 30 or the switch 40.

If there is any device newly found or a device determined to have had a configuration change as a result of the processing performed by the resource change determination unit 212, the monitoring state setting unit 213 prompts the user to determine whether or not to set such devices as monitoring targets. The monitoring state setting unit 213 then sets these devices as either the monitoring target or not.

The monitoring processor 214 monitors the operation states of the server 20, the storage apparatus 30 and the switch 40 in accordance with contents of monitoring state 403 in the device management table 400.

Note that the detailed functions of the resource information acquisition unit 211, the resource change determination unit 212, the monitoring state setting unit 213 and the monitoring processor 214 will be described later.

Figure 2B:
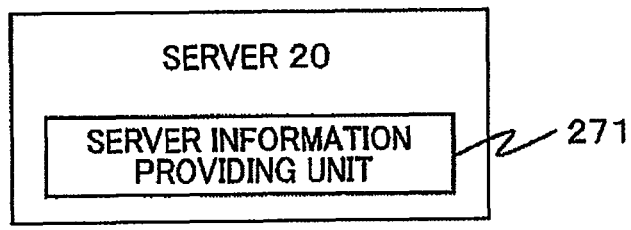
FIG. 2B is a diagram showing a primary function included in the server 20.
Figure 2C:
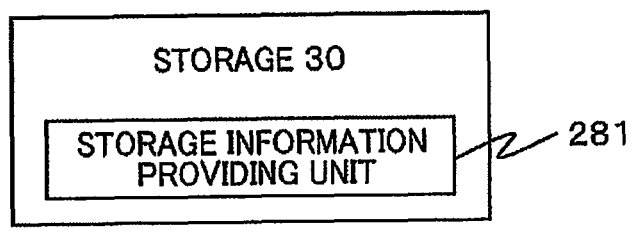
FIG. 2C is a diagram showing a primary function included in the storage apparatus 30.
Figure 2D:
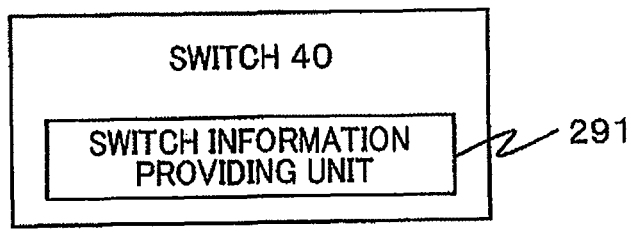
FIG. 2D is a diagram showing a primary function included in the switch 40.

FIGS. 2B to 2D are diagrams respectively showing main functions included in the server 20, the storage apparatus 30 and the switch 40 for the monitoring of the storage system.

As shown in FIG. 2B, the server 20 includes a server information providing unit 271. The server information providing unit 271 sends resource information on the server 20 to the monitoring apparatus 10. As shown in FIG. 2C, the storage apparatus 30 includes a storage information providing unit 281. The storage information providing unit 281 sends resource information on the storage apparatus 30 to the monitoring apparatus 10. As shown in FIG. 2D, the switch 40 includes a switch information providing unit 291. The switch information providing unit 291 sends resource information on the switch 40 to the monitoring apparatus 10.

Note that SNP (Simple Network Management Protocol), for example, is used to accomplish the mechanism for resource information collection performed between the resource information acquisition unit 211 of the monitoring apparatus 10 and each of the server information providing unit 271 of the server 20, the storage information providing unit 281 of the storage apparatus 30 and the switch information providing unit 291 of the switch 40. In this case, the resource information acquisition unit 211 of the monitoring apparatus 10 functions as the SNMP manager, and each of the server information providing unit 271 of the server 20, the storage information providing unit 281 of the storage apparatus 30 and the switch information providing unit 291 of the switch 40 functions as an SNMP agent. Note that the aforementioned mechanism may be implemented by using WMI (Microsoft® Windows® Management Instrumentation, WBEM (Web-Based Enterprise Management), SSH (Secure Shell), SMI-S (Storage Management Initiative—Specification) or the like.

FIG. 3A is an example of the authentication information 300, which is one of the tables managed by the monitoring apparatus 10. The authentication information 300 is used for managing authentication information used when the resource information acquisition unit 211 of the monitoring apparatus 10 acquires the resource information. The user sets contents of the authentication information 300 by operating the user interfaces (the input device 140 and the display 150), for example.

As shown in FIG. 3A, the authentication information 300 is formed of multiple records each including items of a user ID 301, a password 302 and a protocol 303. The protocol 303 stores information indicating the protocol used for acquiring resource information by use of the corresponding user ID and the password.

FIG. 3B is an example of the search range specifying information 350, which is one of the tables managed by the monitoring apparatus 10. The search range specifying information 350 stores information specifying the acquisition destination (identifier such as a network address or a host name) from which the resource information acquisition unit 211 of the monitoring apparatus 10 acquires resource information. In the search range specifying information 350, search ranges are specified by IP addresses. As shown in FIG. 3B, the search range specifying information is formed of multiple records each including items of a first IP address 351 and a last IP address 352. The resource information acquisition unit 211 of the monitoring apparatus 10 attempts to acquire resource information on a device having an IP address that falls within the range of the first IP address 351 to the last IP address 352 of each of the records. The user sets contents of the search range specifying information 350 by operating the user interfaces (the input device 140 and the display 150), for example.

FIG. 4 shows an example of the device management table 400 (monitoring state storage unit), which is one of the tables managed by the monitoring apparatus 10. The device management table 400 is used for managing information related to each of the devices (the server 20, the storage apparatus 30 and the switch 40), the resource information on which has been successfully acquired by the resource information acquisition unit 211. The resource information acquisition unit 211, the resource change determination unit 212, or the monitoring state setting unit 213 manages (updates) the contents of the device management table 400. As shown in FIG. 4, the device management table 400 is formed of multiple records each including items of an identification ID 401, a device type 402, a monitoring state 403, a configuration change or no-change 404 and an IP address 405. Among these items, the identification ID 401 stores an identifier of each of the devices. The device type 402 stores a type of device. In the example shown in FIG. 4, if the applicable device is the server 20, "Server" is stored. Likewise, "Storage" is stored for the storage apparatus 30, and "Switch" is stored for the switch 40.

The monitoring state 403 stores the current monitoring state of an applicable device. Specifically, if the applicable device is currently set to be a monitoring target, "monitoring target" is stored in the monitoring state 403. If the applicable device is currently not set to be the monitoring target, "non-monitoring target" is stored. If the applicable device is currently set to be a semi-monitoring target, "semi-monitoring target" is stored. If the applicable device is set to be neither the monitoring target nor the semi-monitoring target yet, "not set" is stored. In the configuration change or no-change 404, "changed" is set in a case where the resource change determination unit 212 determines, by the processing to be described later, that there is a change in the configuration of the applicable device. In the IP address 405, an IP address (network address) currently set for the applicable device is stored.

Figure 5B:
FIG. 5B is a diagram showing another example of the basic resource information 500.

FIGS. 5A and 5B show examples of the basic resource information 500, which is one of the tables for managing resource information acquired by the monitoring apparatus 10. The resource information acquisition unit 211 manages (updates) the contents of the basic resource information 500. Among the information acquired by the resource information acquisition unit 211 of the monitoring apparatus 10 from the server 20, the storage apparatus 30 or the switch 40 as the resource information, only basic information is stored in the basic resource information 500. FIG. 5A shows an example of the basic resource information 500 acquired from the server 20 by the resource information acquisition unit 211 of the monitoring apparatus 10. FIG. 5B shows an example of the basic resource information 500 acquired from the switch 40 by the resource information acquisition unit 211 of the monitoring apparatus 10.

As shown in FIG. 5A or 5B, the basic resource information 500 is formed of multiple records each having items of an item 501, a last acquisition value 502, a current acquisition value 503 and change or no-change 504. Among the items, an item name forming a piece of the basic resource information is stored in the item 501. The last acquisition value 502 stores a value of the basic resource information for the applicable item that the resource information acquisition unit 211 acquired last time. The current acquisition value 503 stores a value of the basic resource information for the applicable item that the resource information acquisition unit 211 acquires this time. In the change or no-change 504, "changed" is set if there is a change between the content of the last acquisition value 502 and the content of the current acquisition value 503 for the applicable item, and "not changed" is set if there is no change.

FIG. 6 is an example of detailed resource information 600, which is one of the tables for managing resource information acquired by the monitoring apparatus 10. The resource information acquisition unit 211 manages (updates) the contents of the detailed resource information 600. The detailed resource information 600 stores detail information among the information acquired from the server 20, the storage apparatus 30 or the switch 40 by the resource information acquisition unit 211 of the monitoring apparatus 10 as the resource information. Note that FIG. 6 shows the detailed resource information 600 acquired from the server 20 by the resource information acquisition unit 211.

As shown in FIG. 6, the detailed resource information 600 is formed of multiple records each having items of an item 601, a value 602, a state value 603 and a performance value 604. Among the items, the item 601 stores an item name forming a piece of the detailed resource information. The value 602 stores a value corresponding to an applicable item. For example, when the content of the item 601 is "CPU," the model number or the operation clock thereof is stored in the value 602. Likewise, when the content of the item 601 is "Memory," the storage capacity thereof is stored in the value 602. Moreover, when the content of the item 601 is "Disk Drive," the storage capacity thereof is stored in the value 602. The state value 603 stores information indicating an operation state of the applicable item. In FIG. 6, "Normal" or "Abnormal" is stored in the state value 603. The performance value 604 stores information indicating a performance of the applicable item. In FIG. 6, "512M" is stored as the information indicating the performance of "Memory," and "3G" is stored as the information indicating the performance of "Disk Drive" in the performance value 604.

It should be noted that the resource information may be information other than the information shown in FIGS. 5A, 5B and 6. For example, the resource information may be information related to hardware of the switch 40, the communication ports of the switch 40, hardware of the storage, or the like.

FIG. 7 shows an example of a determination rule table 700, which is one of the tables managed by the monitoring apparatus 10. The determination rule table 700 is used for managing determination conditions used when the resource change determination unit 212 determines whether or not there is a change in the configuration of a device (the server 20, the storage apparatus 30 or the switch 40). The user sets the contents of the determination rule table 700 by operating the user interfaces (the input device 140 and the display 150), for example.

As shown in FIG. 7, the determination rule table 700 is formed of multiple records each having items of a monitoring state 701, a device type 702, a comparison information type 703 and a determination condition 704. The monitoring state 701 stores a monitoring state of a device to which a determination condition defined in an applicable record is to be applied. For example, in a case where "semi-monitoring target" is stored in the monitoring state 701, the determination condition defined in the applicable record is applied to a device whose monitoring state is currently set to be "semi-monitoring target" (device whose monitoring state is currently stored as "semi-monitoring target" in the monitoring state 403 in the device management table 400). Furthermore, in a case where "monitoring target" is stored in the monitoring state 701, the determination condition defined in the applicable record is applied to a device whose monitoring state is currently set to be "monitoring target" (device whose monitoring state is currently stored as "monitoring target" in the monitoring state 403 in the device management table 400).

The device type 702 stores a type of device to which a determination condition is to be applied. For example, in a case where "IP device" is stored in the device type 702, the determination condition defined in the applicable record is applied to all devices that perform TCP/IP communications. Moreover, in a case where "XXX OS computer" is stored in the device type 702, the determination condition defined in the applicable record is applied to all devices operating under "XXX OS."

The comparison information type 703 stores information indicating the determination target to be used when a determination condition is applied. For example, in a case where "IP address" is stored in the comparison information type 703, the determination condition defined in the applicable record is determined using the IP address as the determination target. Moreover, in a case where "OS type" is stored in the comparison information type 703, for example, the determination condition defined in the applicable record is determined using the OS type as the determination target.

The determination condition 704 stores a determination condition to be used when the resource change determination unit 212 determines whether or not there is a change in the configuration of a device (the server 20, the storage apparatus 30 or the switch 40).

Description of Processing

Next, a detailed description will be given, with reference to drawings, of processing performed by the monitoring apparatus 10. Note that a letter "S" added in front of a reference numeral refers to a step in the description below.

(Resource Change Determination Processing)

Figure 8:
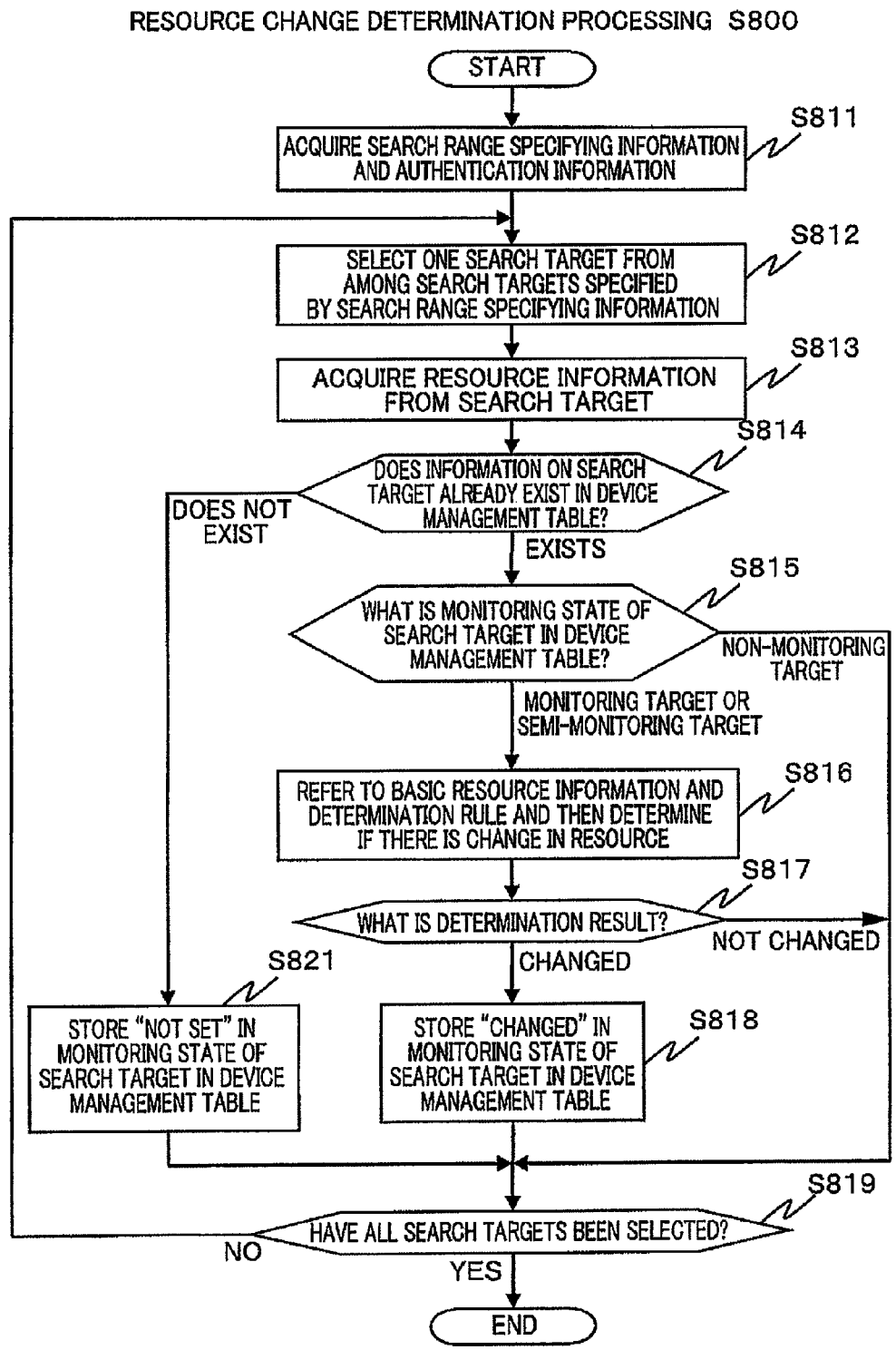
FIG. 8 is a flowchart describing resource change determination processing S800.

FIG. 8 is a flowchart for describing processing performed by the resource information acquisition unit 211 and the resource change determination unit 212 of the monitoring apparatus 10 (hereinafter, referred to as resource change determination processing S800). The resource change determination processing S800 is executed when previously scheduled time arrives. In addition, the resource change determination processing S800 starts in response to a start operation to be performed by the user. Hereinafter, the resource change determination processing S800 will be described with reference to FIG. 8.

Firstly, the resource information acquisition unit 211 acquires the contents of the authentication information 300 and the search range specifying information 350 (S811).

Next, the resource information acquisition unit 211 selects one search target within a search range specified by the acquired search range specifying information 350. For example, in a case where the search range specifying information shows the contents shown in FIG. 3B, the resource information acquisition unit 211 acquires one IP address included in the range from the first IP address to the last IP address (10.210.80.1 to 10.210.80.200, 10.192.63.1 to 10.192.63.250) (S812).

Next, the resource information acquisition unit 211 accesses the search target selected in S812, then acquires the resource information, and updates the current acquisition value 503 of the basic resource information 500 with the contents of the acquired resource information (S813).

Next, the resource change determination unit 212 determines whether or not information on the device of the search target selected in S812 already exists in the device management table 400 (S814). This determination is made by checking whether or not the identification ID (IP address, host name, or the like) of the device of the search target exists in the identification ID 401 of the device management table 400. If the identification ID of the device of the search target exists (S814: YES), the processing proceeds to S815. If the identification ID of the device of the search target does not exist (S814: NO), the processing proceeds to S821.

In S815, the resource change determination unit 212 checks the content of the monitoring state 403 of the search target in the device management table 400. In a case where the content of the monitoring state 403 is "monitoring target" or "semi-monitoring target" (S815: monitoring target or semi-monitoring target), the processing proceeds to S816. In a case where the content of the monitoring state 403 is "non-monitoring target," (S815: non-monitoring target), the processing proceeds to S819.

In S816, the resource change determination unit 212 refers to the basic resource information 500 and the determination rule table 700 to determine if there is a change in the resources. In a case where the resource change determination unit 212 determines that there is a change in the resources (S817: Changed), the processing proceeds to S818. In a case where the resource change determination unit 212 determines that there is no change in the resources (S817: Not Changed), the processing proceeds to S819.

In S818, the resource change determination unit 212 stores "Changed" in the configuration change or no-change 404 of the search target in the device management table 400. The processing proceeds to S819, thereafter.

In S821, the resource change determination unit 212 stores "Not Set" in the monitoring state 403 of the search target in the device management table 400.

In S819, the resource information acquisition unit 211 determines whether or not all of the search targets specified by the search range specifying information acquired in S811 have been selected. If all of the search targets have been selected (S819: YES), the processing ends. If a search target that has not been selected yet exists (S819: NO), the processing returns to S812, and the resource information acquisition unit 211 selects the next search target to repeat the aforementioned processing.

Through the execution of the resource change determination processing S800 described above, the contents corresponding to the latest state of the storage system are stored in the monitoring state 403 and the configuration change or no-change 404 of the device management table 400.

(Monitoring Target Setting Processing)

Figure 9:
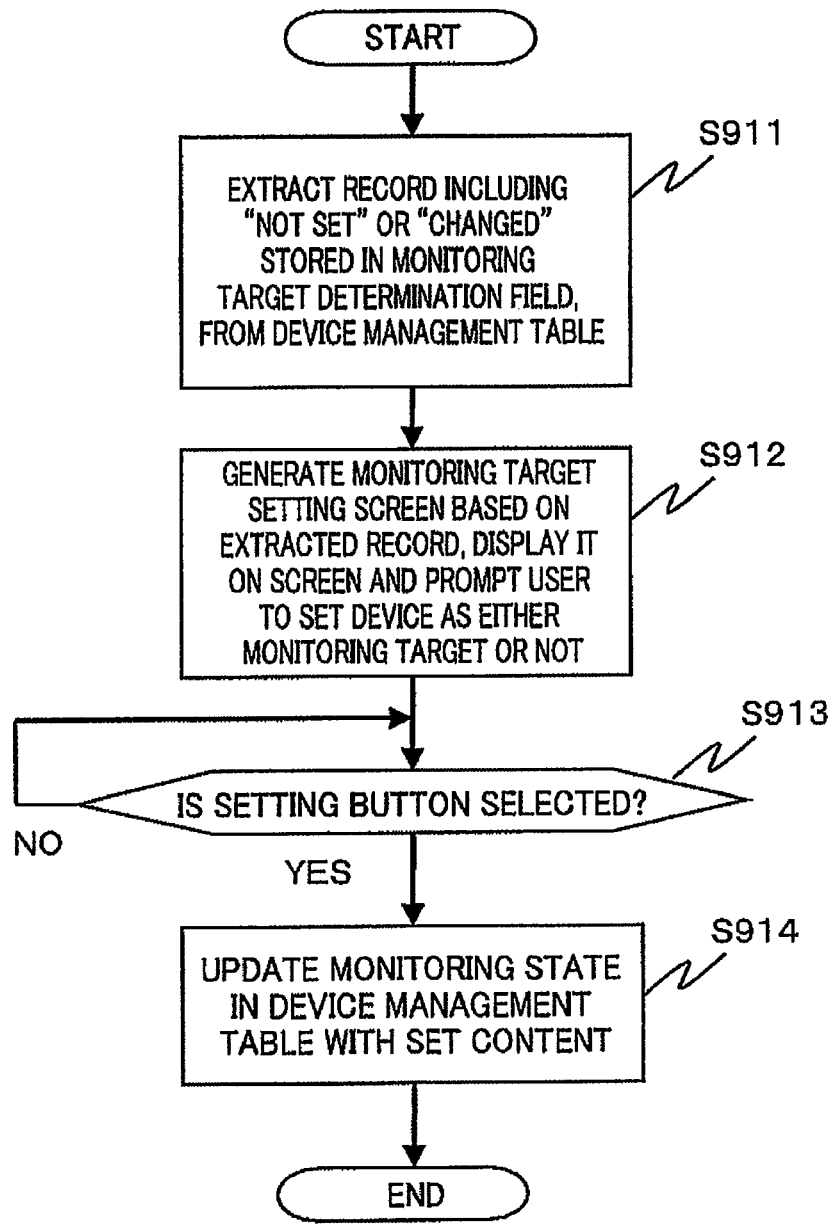
FIG. 9 is a flowchart describing monitoring state setting processing S900.

FIG. 9 is a flowchart for describing processing performed by the monitoring state setting unit 213 of the monitoring apparatus 10 (hereinafter, referred to as a monitoring state setting processing S900). As a general rule, the monitoring state setting processing S900 is executed automatically immediately after the execution of the resource change determination processing S800, or in response to a start operation performed by the user. Hereinafter, the monitoring state setting processing S900 will be described with reference to FIG. 9.

Firstly, the monitoring state setting unit 213 extracts a record in which "Not Set" or "Changed" is stored from the device management table 400 for determining a monitoring target (S911).

Figure 10:
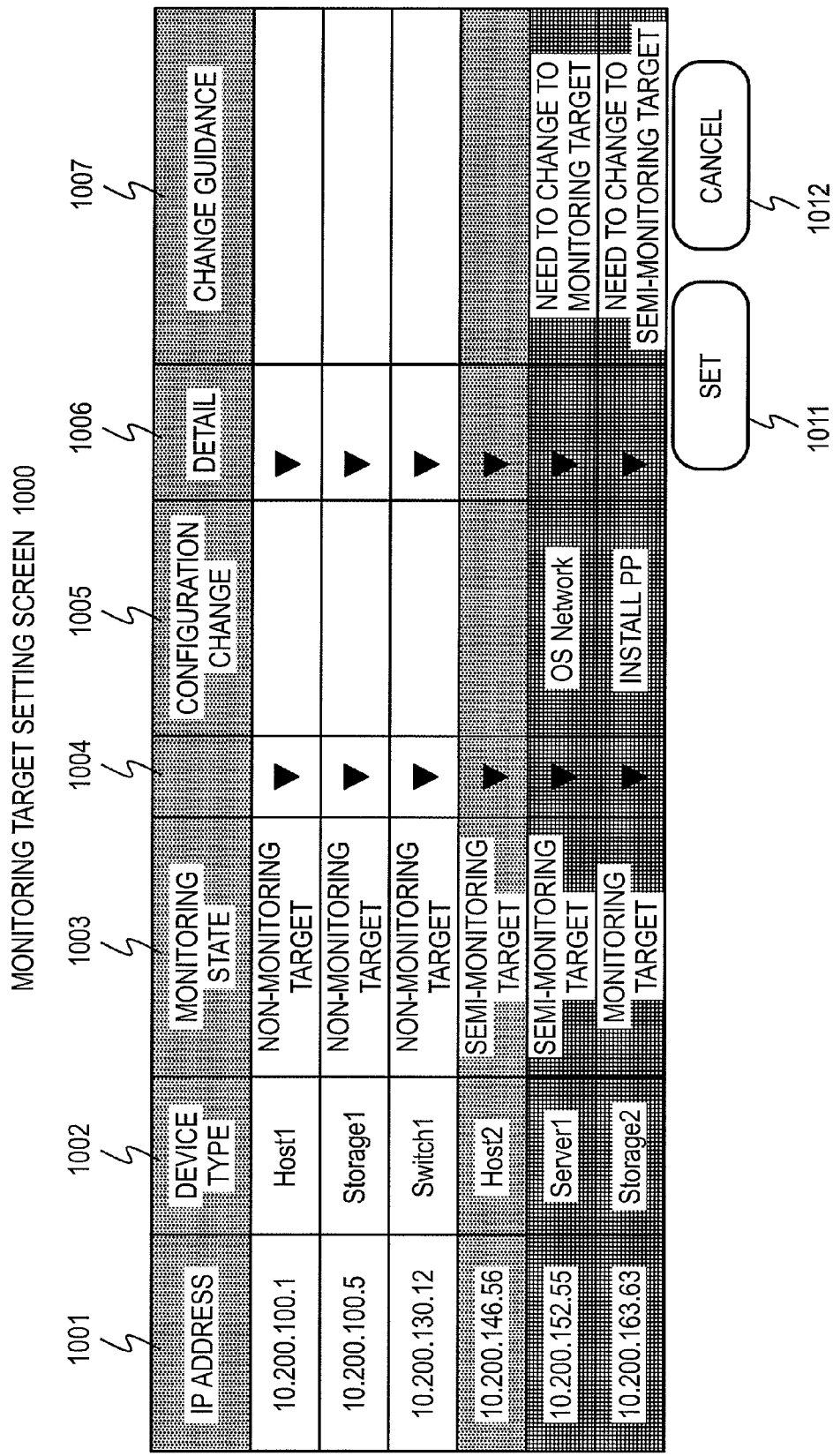
FIG. 10 is an example of a monitoring target setting screen 1000.

Next, the monitoring state setting unit 213 causes the display 150 to display a setting screen indicating the contents of the record extracted in S911 (hereinafter, referred to as a monitoring target setting screen 1000), and then prompts the user to set a monitoring state for each of the devices (S912). FIG. 10 shows an example of the monitoring target setting screen 1000 to be displayed at this time. As shown in FIG. 10, this monitoring target setting screen 1000 includes an IP address 1001, a device name 1002, a monitoring state 1003, a monitoring state selection button 1004, a configuration change 1005, a detail display button 1006 and a change guidance 1007.

Among the aforementioned items, the contents of the IP address 405 of the device management table 400 are displayed in the IP address 1001. The contents of the device type 402 of the device management table 400 are displayed in the device type 1002. The contents of the monitoring state 403 of the device management table 400 are displayed in the monitoring state 1003, the contents being set by default. When the user operates the monitoring state selection button 1004, the user can change the content set by default and displayed in the monitoring state 1003 to another monitoring state (monitoring target, semi-monitoring target or non-monitoring target). In a case where a content of the configuration change or no-change 404 of an applicable device in the device management table 400 is "Changed," the content of the change in the configuration of the applicable device is displayed in the configuration change 1005. When the user selects the detail display button 1006, detail information corresponding to the content of the configuration change 1005 is displayed.

A change guidance of the monitoring state 1003 is displayed in the change guidance 1007. For example, in a case where the content of the configuration change suggests a change from a semi-monitoring target to a monitoring target, the content indicating "required to change to a monitoring target" is displayed. In addition, in a case where the content of the configuration change suggests a change from a monitoring target to a semi-monitoring target, the content indicating "required to change to a semi-monitoring target" is displayed. The monitoring apparatus 10 manages (stores) a table in which the display contents of the change guidance 1007 are stored in association with the forms of the device types and the configuration changes. The monitoring state setting unit 213 determines, with reference to the aforementioned table, the content to be displayed in the change guidance 1700 and then displays the determined content in the change guidance 1007. Note that the user or the like can set the aforementioned table by operating the user interfaces (the input device 140 and the display 150) of the monitoring apparatus 10.

The monitoring state setting unit 213 monitors in real time whether or not a setting button 1011 on the monitoring state setting screen 1000 is selected (S913). When the setting button 1011 is selected (S913: YES), the processing proceeds to S914.

In S914, the monitoring state setting unit 213 updates the monitoring state 403 of the device management table 400 with the content set in the monitoring state 1003 of the monitoring target setting screen 1000. Then, the processing ends.

Incidentally, the monitoring processor 214 appropriately (at a previously scheduled date and time or the like) executes required monitoring processing for a device (the server 20, the storage apparatus 30 or the switch 40) whose content of the monitoring state 403 is "monitoring target" in the device management table 400, the content being set in accordance with the aforementioned manner. For example, the monitoring processor 214 appropriately monitors the operation state to check if the device is in an abnormal state, by acquiring device configuration information, performance information and various types of log (such as event or security log) of the applicable device as appropriate.

As described above, according to the monitoring apparatus 10 of the present embodiment, for a device currently set to be a semi-monitoring target, whether or not there is a change in the resources is appropriately determined (S816). Then, in a case where it is determined that there is a change in the resources (S817: Changed), the user is prompted to set the monitoring state of the applicable device (S912). Accordingly, when there is a change in the resources (configuration) of a device, the user is automatically provided with an opportunity to determine whether or not to change the monitoring state of the device that is currently set to be a semi-monitoring target to a monitoring target. Thus, it is possible to prevent a situation where the user cannot notice an important trouble with a device not being monitored because the user forgets to change the monitoring state of the device from the semi-monitoring target to the monitoring target when the user needs to change the monitoring state of the device to the monitoring target due to a change in the resources.

Moreover, whether or not there is a change in the resources is appropriately determined for a device whose monitoring state is currently set to be a monitoring target (S816). In a case where it is determined that there is a change in the resources (S817: Changed), the user is prompted to set the monitoring state of the applicable device (S912). Accordingly, when there is a change in the resources (configuration) of the device, the user is automatically provided with an opportunity to determine whether or not to change the monitoring state of a device currently set to be a monitoring target to a semi-monitoring target (or non-monitoring target). Thus, it is possible to prevent a situation where a device which is no longer needed to be the monitoring target due to a change in the resources is continuously monitored because the user forgets to change the monitoring state of the device from the monitoring target to the semi-monitoring target (or non-monitoring target).

Embodiment 2

In Embodiment 1, the description has been given of the configuration in which the monitoring apparatus 10 manages the monitoring state on a device basis (the server 20, the storage apparatus 30 and the switch 40). However, the monitoring apparatus 10 can manage the monitoring state of each of the communication ports on a communication port basis by use of the same method as the method used in Embodiment 1.

FIG. 11 shows an example of a device management table (monitoring state storage unit) in the case where the monitoring apparatus 10 monitors the monitoring state of each of the communication ports on a communication port basis (hereinafter, referred to as "this case"). As shown in FIG. 11, this device management table 450 is formed of one or more records each including items of a device ID 451, a device type 452, an IP address 453, a port number 454, a monitoring state 455 and configuration change or no-change 456. Unlike the device management table 400 shown in FIG. 4, the device management table 450 manages the monitoring state 455 and the configuration change or no-change 456 for each port number 454.

FIG. 12 shows an example of basic resource information 550 (port information) in this case. As shown in FIG. 12, the basic resource information 550 is formed of multiple records each having the same items as those in the basic resource information 500 shown in FIG. 5A or 5B. As shown in FIG. 12, the basic resource information 550 stores a last acquisition value 552 (a state of each port), a current acquisition value 553 (a state of each port) and change or no-change 554 for each of the communication ports.

FIG. 13 shows an example of a determination rule table in this case. As shown in FIG. 13, this determination rule table 750 is formed of multiple records each having the same items as those in the determination rule table 700 shown in FIG. 7.

The monitoring apparatus 10 can manage the monitoring state of each of the communication ports on a communication port basis, and the same effects as those obtained in Embodiment 1 can be also obtained when the resource change determination processing S800 and the monitoring target setting processing S900 are executed in aforementioned Embodiment 1 by use of the following information and tables: the device management table 450 shown in FIG. 11, the basic resource information 550 shown in FIG. 12 and the determination rule table 750 shown in FIG. 13, in place of the device management table 400 shown in FIG. 4, the basic resource information 500 shown in FIG. 5A or 5B and the determination rule table 700 shown in FIG. 7, respectively.

Specifically, when use of a communication port set to be a non-monitoring target is started, the user is automatically provided with an opportunity to determine whether or not to change the monitoring state of the communication port to the monitoring target. Thus, it is possible to prevent a situation where the user cannot notice an important trouble with a communication port not being monitored because the user forgets to change the monitoring state of the communication port to the monitoring target when the user needs to change the monitoring state of the communication port.

Furthermore, the user is automatically provided with an opportunity to determine whether or not to change the monitoring state of a communication port that is currently set to be a monitoring target to a semi-monitoring target (or non-monitoring target). Thus, it is possible to prevent a situation where unnecessary monitoring is continued because the user forgets to change the monitoring state of the communication port to the semi-monitoring target (or non-monitoring target) from the monitoring target when the monitoring target of the communication port becomes no longer needed to be the monitoring target.

Incidentally, the above descriptions of Embodiments are provided to facilitate understanding of the present invention and not to limit the present invention. In addition, as a matter of course, the present invention may be changed or modified without departing the sprit and scope of the present invention, and the present invention includes equivalents thereof.

The invention claimed is:

1. An information system comprising:
a plurality of devices including resources; and
a monitoring apparatus configured to manage monitoring states corresponding to the plurality of devices,
wherein each of the monitoring states is selected at least from a monitoring target state and a semi-monitoring target state,
wherein the monitoring apparatus is further configured to acquire one of a state value and a performance value of a first resource in a first device whose monitoring state is set to be the monitoring target state, and
wherein the monitoring apparatus is further configured to determine whether or not a second device whose current monitoring state is set to be the semi-monitoring target state is changed, and to output information prompting a change of a monitoring state of the second device from the semi-monitoring target state to the monitoring target state, if the second device is changed,
wherein the monitoring apparatus is further configured to acquire, after changing the monitoring state of the second device to be the monitoring target state, one of a state value and a performance value of a second resource in the second device,
wherein the acquisition of the one of a state value and performance value of the first resource is executed based on a schedule for checking the abnormal state of the first device, and
wherein the change of the second device is decided by: acquiring first resource information from the second device at a first timing; acquiring second resource information from the second device at a second timing; and comparing the first resource information and the second resource information.

2. An information system according to claim 1, wherein the monitoring apparatus is further configured to acquire one of an event log and a security log from the first device.

3. An information system according to claim 1, wherein each of the monitoring states is further selected from a non-monitoring target state, and
wherein the monitoring apparatus is further configured to acquire one of a state value and a performance value of a third resource in a third device whose monitoring state is set to be the non-monitoring target state.

4. An information system according to claim 1, wherein the change of the second device is a configuration or setting change of the second device.

5. An information system according to claim 1, wherein the change of the second device is determined based on a rule set by a user interface.

6. A monitoring apparatus comprising:
a memory configured to store a monitoring program; and
a CPU configured to execute the monitoring program;
wherein the monitoring program, when executed, causes the CPU to:
manage monitoring states corresponding to a plurality of devices including resources, wherein each of the monitoring states is selected at least from a monitoring target state and a semi-monitoring target state;
acquire one of a state value and a performance value of a first resource in a first device whose monitoring state is set to be the monitoring target state;

determine whether or not a second device whose monitoring state is set to be the semi-monitoring target state is changed; and output information prompting a change of a monitoring state of the second device from the semi-monitoring target state to the monitoring target state, if the second device is changed, wherein, after changing the monitoring state of the second device to the monitoring target state, the monitoring program causes the CPU to acquire one of a state value and a performance value of a second resource in the second device, wherein the acquisition of the one of the state value and the performance value of the first resource is executed based on a schedule for checking the abnormal state of the first device, and wherein the change of the second device is decided by: acquiring first resource information from the second device at a first timing; acquiring second resource information from the second device at a second timing; and comparing the first resource information and second resource information.

7. A monitoring apparatus according to claim 6, wherein the monitoring apparatus is configured to acquire one of an event log and a security log from the first device.

8. A monitoring apparatus according to claim 6, wherein each of the monitoring states is further selected from a non-monitoring target state, and wherein the monitoring apparatus is configured to acquire one of a state value and a performance value of a third resource in a third device whose monitoring state is set to be the non-monitoring target state.

9. A monitoring apparatus according to claim 6, wherein the change of the second device is a configuration or setting change of the second device.

10. A monitoring apparatus according to claim 6, wherein the change of the second device is determined based on a rule set by a user interface.

11. A memory storing a monitoring program, the monitoring program comprising steps executed by a monitoring apparatus of:

managing monitoring states corresponding to a plurality of devices including resources, wherein each of the monitoring states is selected at least from a monitoring target state and a semi-monitoring target state;

acquiring one of a state value and a performance value of a first resource in a first device whose monitoring state is set to be the monitoring target state;

determining whether or not a second device whose monitoring state is set to be the semi-monitoring target state is changed;

outputting information prompting a change of a monitoring state of the second device from the semi-monitoring target state to the monitoring target state, if the second device is changed; and acquiring a state value or a performance value of a second resource in the second device after changing the monitoring state of the second device to be the monitoring target state, wherein the acquisition of the state value or the performance value of the first resource is executed based on a schedule for checking the abnormal state of the first device, and wherein the change of the second device is decided by: acquiring first resource information from the second device at a first timing; acquiring second resource information from the second device at a second timing; and comparing the first resource information and second resource information.

12. A memory storing a monitoring program according to claim 11, wherein the monitoring program further comprises a step executed by a monitoring apparatus of:

acquiring one of an event log and a security log from the first device.

13. A memory storing a monitoring program according to claim 11, wherein each of the monitoring states is further selected from a non-monitoring target state, and wherein the monitoring program further comprises a step executed by a monitoring apparatus of:

causing the monitoring apparatus to acquire one of a state value and a performance value of a third resource in a third device whose monitoring state is set to be the non-monitoring target state.

14. A memory storing a monitoring program according to claim 11, wherein the change of the second device is a configuration or setting change of the second device.

15. A memory storing a monitoring program according to claim 11, wherein the change of the second device is determined based on a rule set by a user interface.

* * * * *